United States Patent [19]

Gottschalk et al.

[11] 4,158,488

[45] Jun. 19, 1979

[54] BODY-MOUNTED SUPPORT DEVICE FOR MOTION PICTURE CAMERA

[75] Inventors: Robert E. Gottschalk, Los Angeles; Felipe Navarro, Granada Hills; Carl F. Fazekas, Tarzana, all of Calif.

[73] Assignee: Panavision, Incorporated, Tarzana, Calif.

[21] Appl. No.: 706,196

[22] Filed: Jul. 19, 1976

[51] Int. Cl.² .............................................. G03B 17/00
[52] U.S. Cl. ................................... 352/243; 224/908; 248/179; 354/70; 354/82; 354/293
[58] Field of Search ................... 352/243; 354/70, 81, 354/82, 294, 293; 248/18, 123, 179, 183, 280, 281, 284, 400; 224/5 R, 5 V

[56] References Cited

U.S. PATENT DOCUMENTS

| | | | |
|---|---|---|---|
| 568,977 | 10/1896 | Helmore | 248/400 |
| 817,207 | 4/1906 | Wheeler | 354/82 |
| 2,007,215 | 7/1935 | Remey | 352/243 |
| 3,215,386 | 11/1965 | Swenson | 248/400 |
| 3,409,261 | 11/1968 | Leporati | 248/284 |
| 4,017,168 | 4/1977 | Brown | 352/243 |

FOREIGN PATENT DOCUMENTS 1187504 2/1965 Fed. Rep. of Germany .......... 248/400

*Primary Examiner*—Monroe H. Hayes
*Attorney, Agent, or Firm*—Lyon & Lyon

[57] ABSTRACT

A body-mounted support device for a motion picture camera employs a pair of serially connected articulated arm assemblies attached to a body harness and positioned to support a gimbal device. A camera support tube is mounted on the gimbal device and carries a motion picture camera on its upper end, and a battery and, optionally, the camera motor, at its lower end. Pneumatic cushion means associated with the articulated arm assemblies dampen unwanted movements of the motion picture camera. An emergency release mechanism is provided to disconnect the entire device from the body harness. Telescoping parts of the camera support tube permit the camera to be operated from a very low elevation with respect to the floor. The battery carrier at the lower end of the support tube has a portion which may be swung to one side so that gravity may bring the camera support tube into vertical position.

3 Claims, 14 Drawing Figures

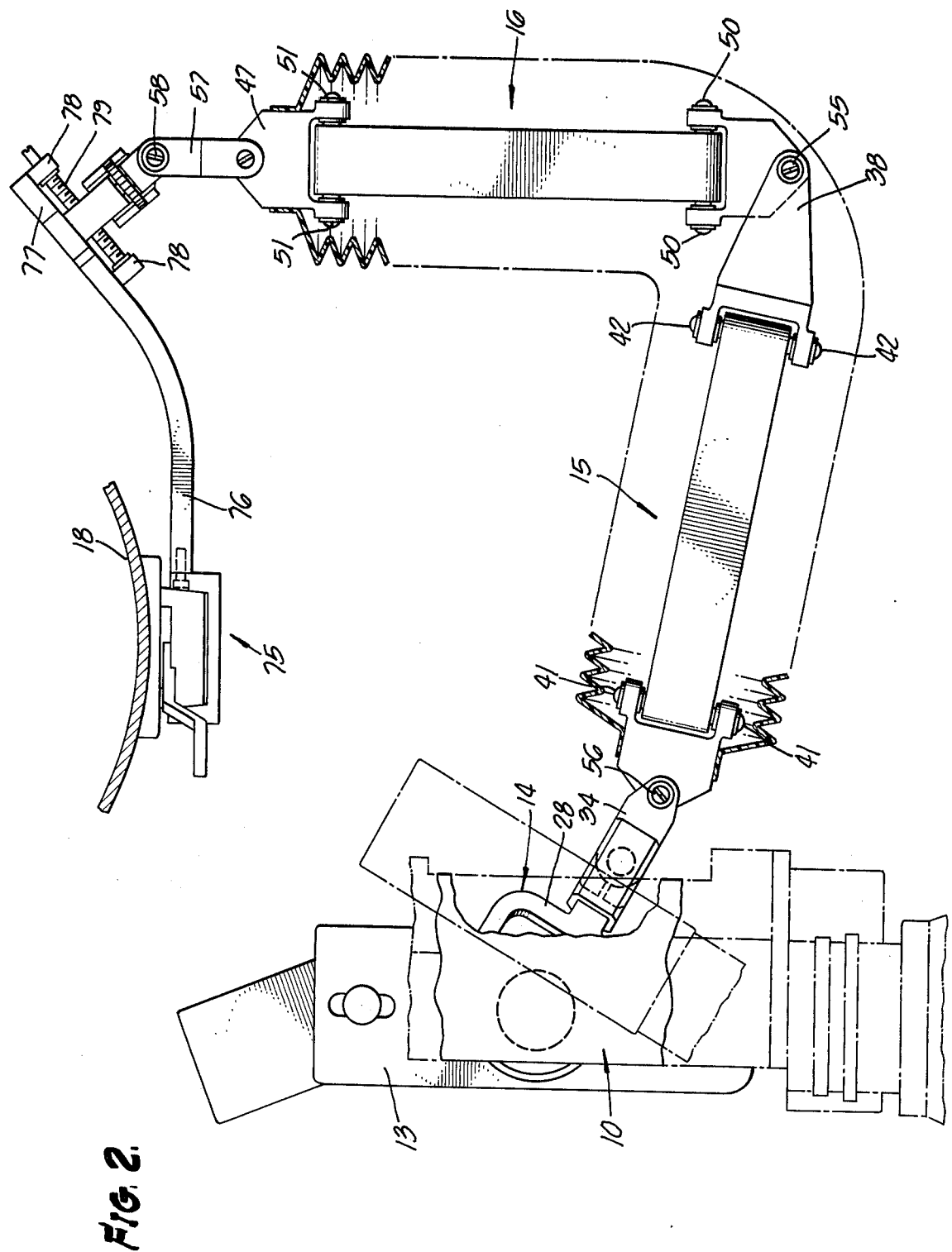

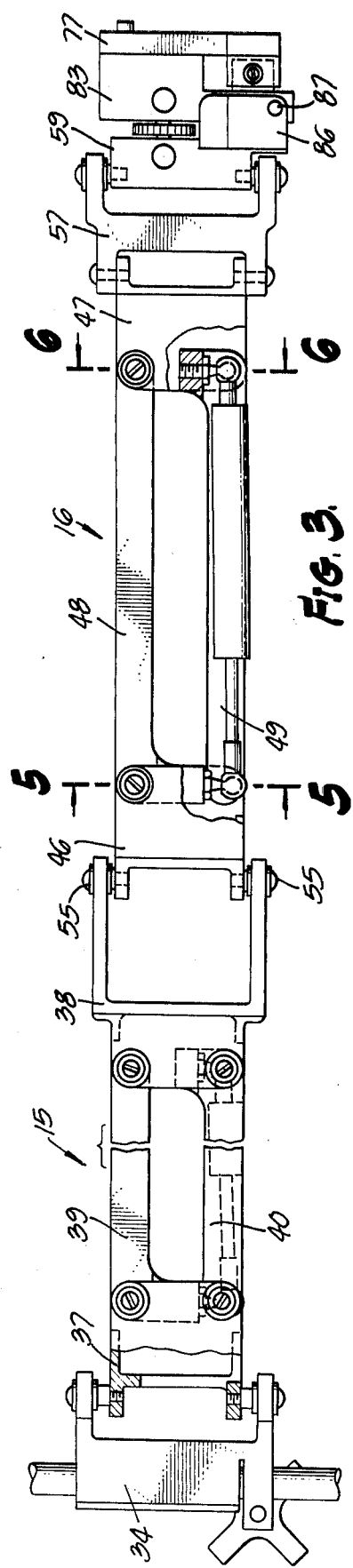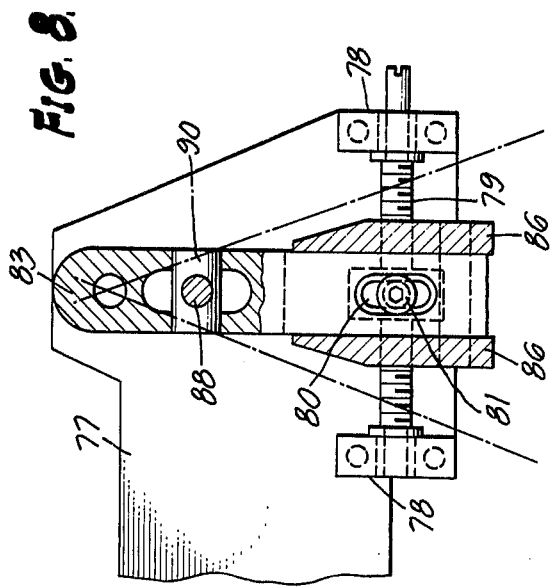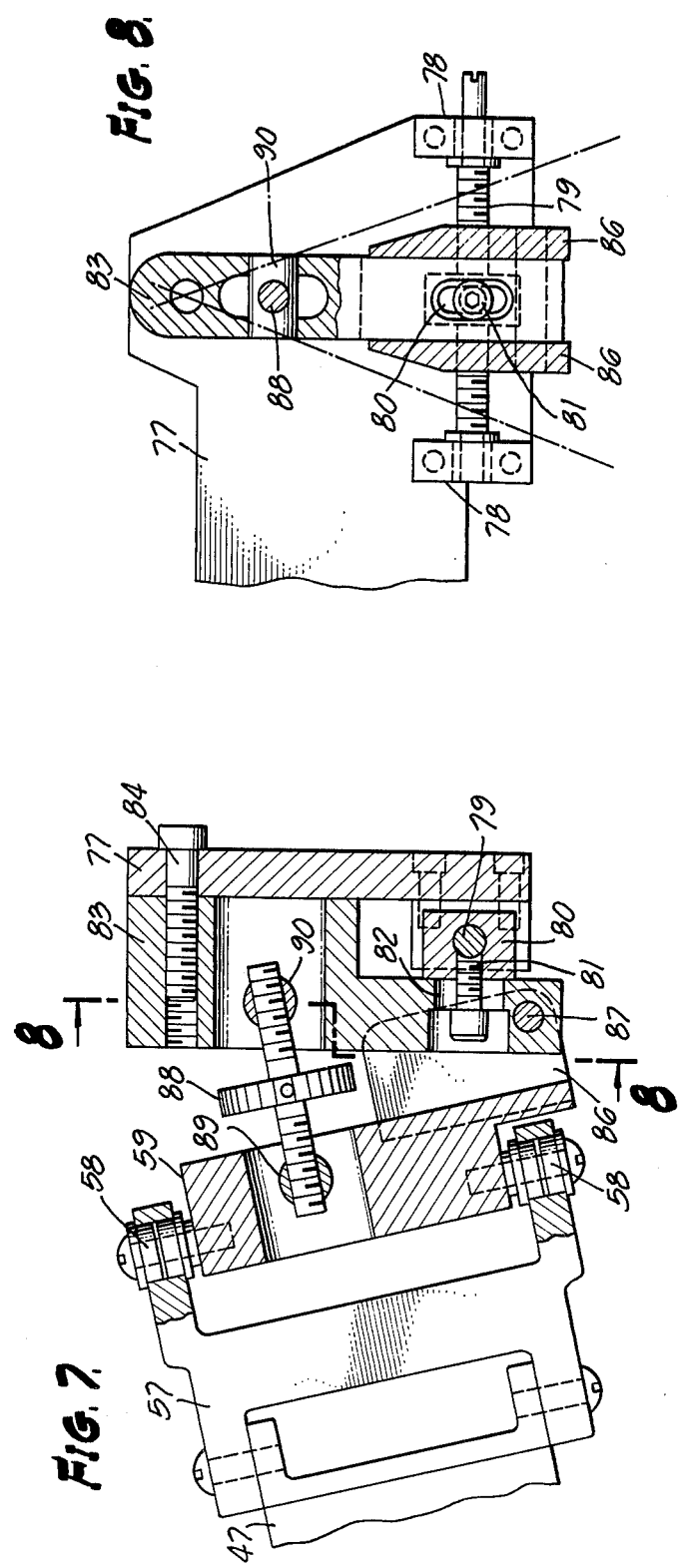

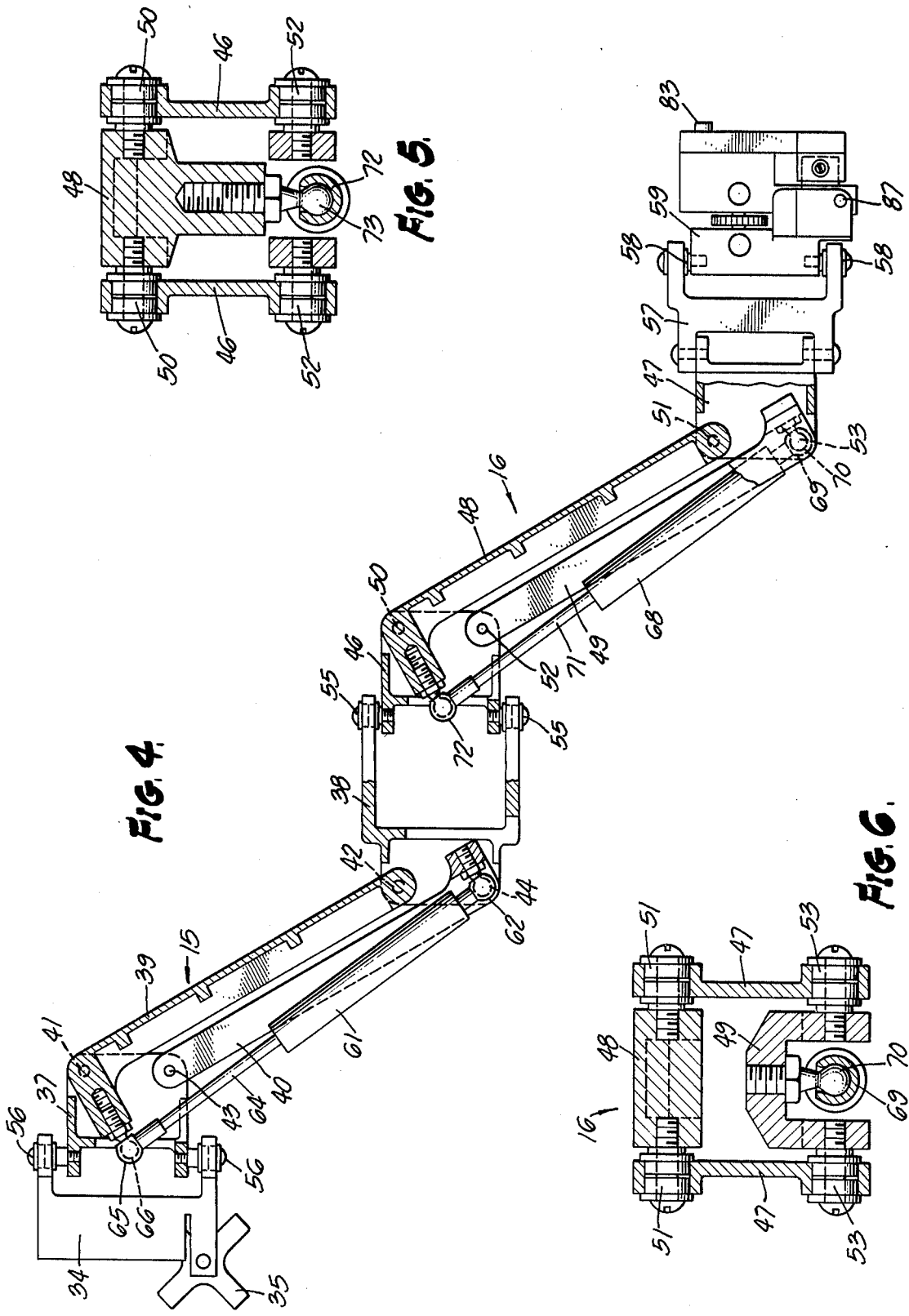

BODY-MOUNTED SUPPORT DEVICE FOR MOTION PICTURE CAMERA

This invention relates to support devices for professional motion picture cameras and is particularly directed to a camera supporting device which may be carried by a cameraman or camera operator or other person, while minimizing the transmission of unwanted movements to the motion picture camera. A motion picture camera supported in this manner often eliminates the need for "dolly" shots, and permits the director to obtain unusual photographic effects such as may be obtained by running up a flight of stairs or running along side a moving vehicle or employing the device to steady the motion picture camera on a moving platform such as a land vehicle, boat or airplane.

Hand-held motion picture cameras have been used professionally with considerable success, but much depends upon the individual skill and stamina of the camera operator. The device of the present invention relieves the camera operator of the requirement of supporting in his hands the weight of the motion picture camera assembly, and instead causes the weight of the entire device to be carried on a body harness worn by the operator. He may move about while the motion picture camera "floats" in space, and he uses one hand to aim the camera in the desired direction. The motion picture camera assembly is mounted upon a support tube above a gimbal device, and the battery and possibly the camera motor are carried on the lower end of the support tube well below the gimbal device, to steady the camera against unwanted movements. Articulated arms assemblies with pneumatic cushion devices support the gimbal device upon the body harness.

Other and more detailed objects and advantages will appear hereinafter.

In the drawings:

FIG. 2 is a top plan view showing a portion of the apparatus.

FIG. 3 is a side elevation partly broken away, showing the articulated arm assemblies for supporting the motion picture camera assembly on the body harness, the parts being shown in extended horizontal position.

FIG. 4 is a view similar to FIG. 3, the parts being shown in elevated position.

FIG. 5 is a sectional detail taken substantially on the lines 5—5 as shown in FIG. 3.

FIG. 6 is a sectional detail taken substantially on the lines 6—6 as shown in FIG. 3.

FIG. 7 is a sectional side elevation showing a portion of the device adjacent the belt of the body harness.

FIG. 8 is a sectional detail taken substantially on the lines 8—8 as shown in FIG. 7.

Figure 1:
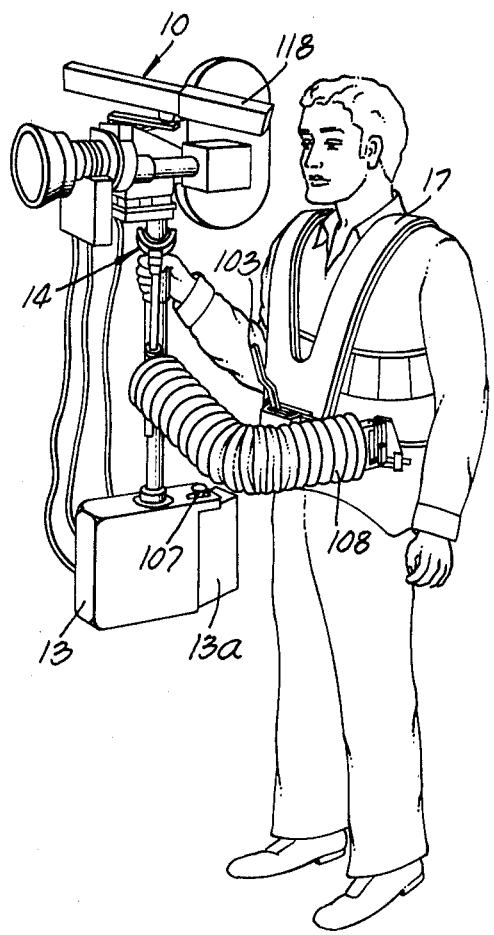
FIG. 1 is a perspective side elevation showing a preferred embodiment of this invention.

Referring to the drawings, a motion picture camera assembly generally designated 10 is mounted on a free-floating support mechanism 11 which includes a camera support tube member 12, battery carrier 13, gimbal device 14, a pair of serially connected articulated arm assemblies 15 and 16, and a body harness 17 which includes a belt 18. The body harness 17 and belt 18 are proportioned to be worn by a person such as a cameraman or a camera operator.

Figure 9:
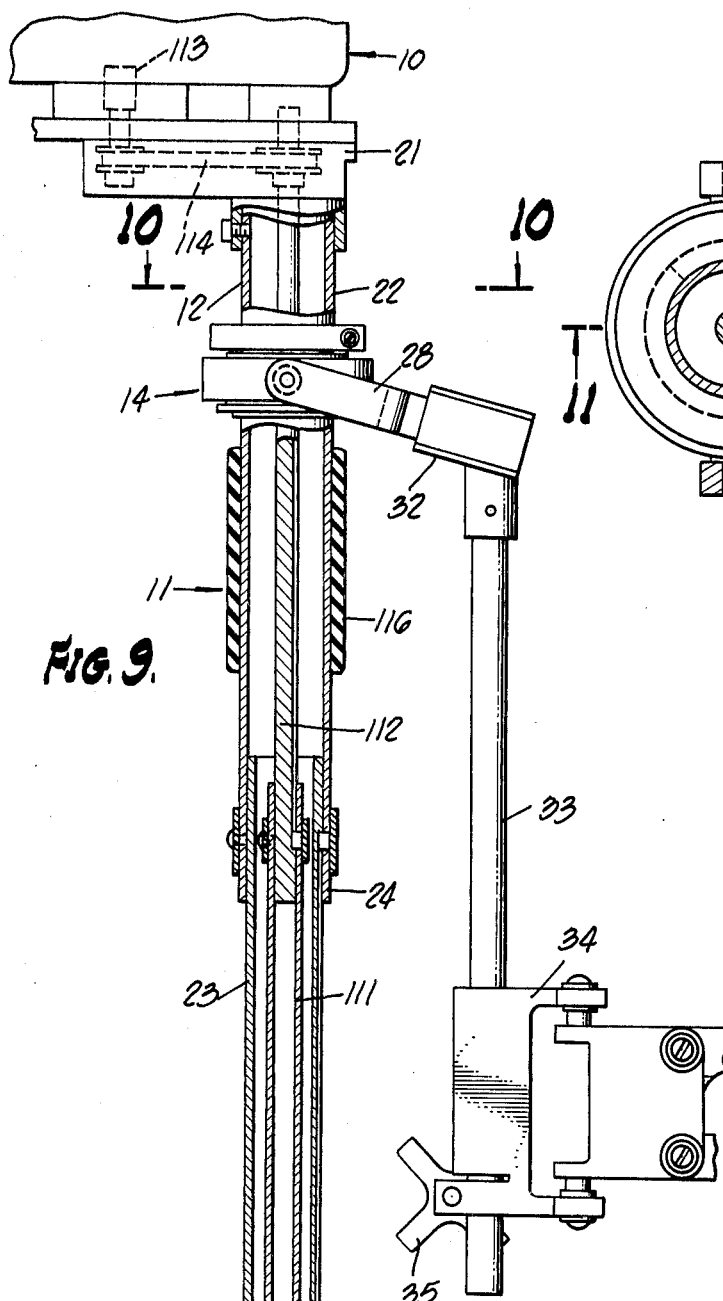
FIG. 9 is a sectional elevation showing the gimbal device carrying the camera support tube member.

As best shown in FIG. 9, the camera base 21 is secured to the upper end of the camera support tube member 12 and this tube member 12 is formed of two telescoping parts. The upper part 22 telescopically receives the lower part 23 by means of a spline joint connection 24. The battery carrier 13 is fixed at the lower end of the lower tube 23.

Figure 10:
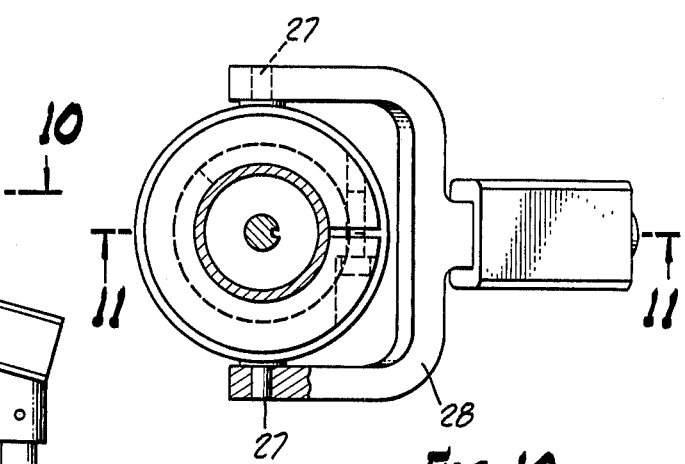
FIG. 10 is a sectional plan view taken substantially on the lines 10—10 as shown in FIG. 9.
Figure 11:
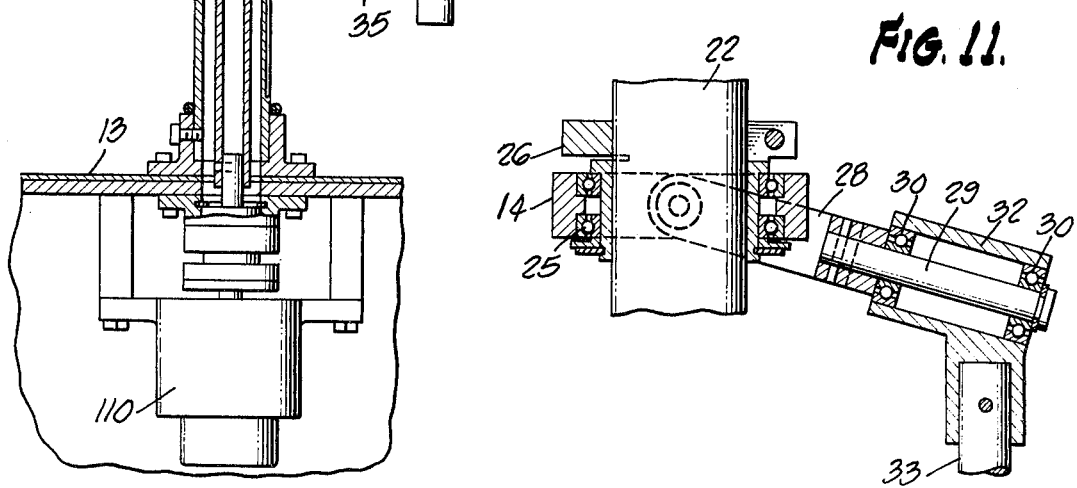
FIG. 11 is a sectional elevation taken substantially on the lines 11—11 as shown in FIG. 10.

The gimbal device 14 includes a ring 24 mounted on bearings 25 carried on clamping sleeve 26. The sleeve 26 may be clamped at any desired position on the upper part 22 of the camera support tube 12. As shown in FIG. 10, the ring 24 includes a pair of diametrically extending trunnions 27 pivotally received in the arms of a yoke 28 having an integral stem 29 extending at right angles to the axis of the aligned trunnions 27. The stem 29 is received in bearings 30 carried in socket member 32 fixed on the upper end of the upright rod 33. A bracket 34 is mounted to slide on the rod 33 and may be fixed in any desired position by means of the clamping screw 35.

The arm assembly 15 includes an end member 37, an end member 38, and a pair of links 39 and 40 each pivotally connected to the end members 37 and 38. Thus, the link 39 is pivotally connected to the end member 37 and 41 and is pivotally connected to the end member 38 at 42. Similarly, the link 40 is pivotally connected to the end member 37 at 43 and is pivotally connected to end member 38 at 44. The construction of the arm assembly 16 is similar to that described for the arm assembly 15. Thus, the end members 46 and 47 are each pivotally connected by a pair of links 48 and 49. The link 48 is pivotally connected to the end member 46 at 50 and is pivotally connected to the end member 47 at 51. The link 49 is pivotally connected to the end member 46 at 52 and is pivotally connected to the end member 47 at 53.

The end member 38 of the arm assembly 15 is connected to the end member 46 of the arm assembly 16 by means of spaced pivots 55 which are aligned on a vertical axis. Similarly, the pivots 56 are aligned on a vertical axis to connect the end member 37 to the bracket 34. Also, the end member extension 57, fixed to the end member 47, is connected by aligned vertical pivots 58 to the vertical adjustment block 59. The proportions of the parts forming the arm assembly 15 and the arm assembly 16 are such that the links and their pivotal connections to their respective end members form parallelograms. Accordingly, the parts may move between the extended horizontal position shown in FIG. 3 and the elevated position shown in FIG. 4.

Resilient means are provided for supporting and cushioning the weight of the parts carried on the gimbal device 14 and, as shown in the drawings, this means includes a pneumatic piston-and-cylinder assembly associated with each of the arm assemblies 15 and 16. Thus, the pneumatic assembly 61 has a cylinder portion carrying a socket 62 which engages the ball 63 mounted on the link 40. The assembly 61 also includes a piston rod 64 provided with a socket 65 which engages a ball 66 carried on the link 39. When the arm assembly 15 moves from the position shown in FIG. 4 to the position shown in FIG. 3, the piston rod 64 moves back into the cylinder to increase pneumatic pressure therein. In a similar fashion, the pneumatic piston-and-cylinder assembly 68 has a socket 69 on the cylinder end which engages the ball 70 carried on the link 49. The piston rod 71 of the assembly 68 carries a socket 72 which engages the ball 73 secured to the link 48. When the arm assembly 16 moves from the position shown in FIG. 4 to the position shown in FIG. 3, the piston rod 71 is moved back into the cylinder to increase pneumatic pressure therein.

As best shown in FIG. 2, the belt 18 carries a latch mechanism generally designated 75 at a forward midportion of the belt. A curved member 76 extends laterally from the latch mechanism 75 around to the left side of the person wearing the belt 18, and this curved member 76 has an end portion 77 near the position of the left hip of the person, and this end portion 77 is provided with a pair of ears 78 which support a threaded adjustment screw 79. The adjustment screw 79 passes through an internally threaded nut 80 (see FIGS. 7 and 8) which nut 80 carries a cap screw 81 extending at right angles to the axis of the adjustment screw 79. The cap screw 81 slides within a vertical slot 82 provided in the adjustment block 83. This block 83 is pivotally mounted with respect to the end portion 77 of curved member 76 by means of the pivot pin 84. From this description it will be understood that turning of the adjusting screw 79 causes the cap screw 81 to swing the block 83 about the horizontal axis of the pivot pin 84.

The block 59 is provided with parallel guide lugs 86 which receive a portion of the block 83 between them in sliding relationship. The horizontal pivot pin 87 connects the blocks 59 and 83. An adjusting screw 88 has left-hand and right-hand threads which engage the internally threaded pivot pins 89 and 90 mounted on the blocks 59 and 83, respectively. Turning of the adjusting screw 88 serves to swing the block 59 with respect to the block 83 about the horizontal axis of the pivot pin 87. While both pivot pins 84 and 87 are horizontal, their respective axes are contained in vertical planes which are perpendicular to each other.

Figure 12:
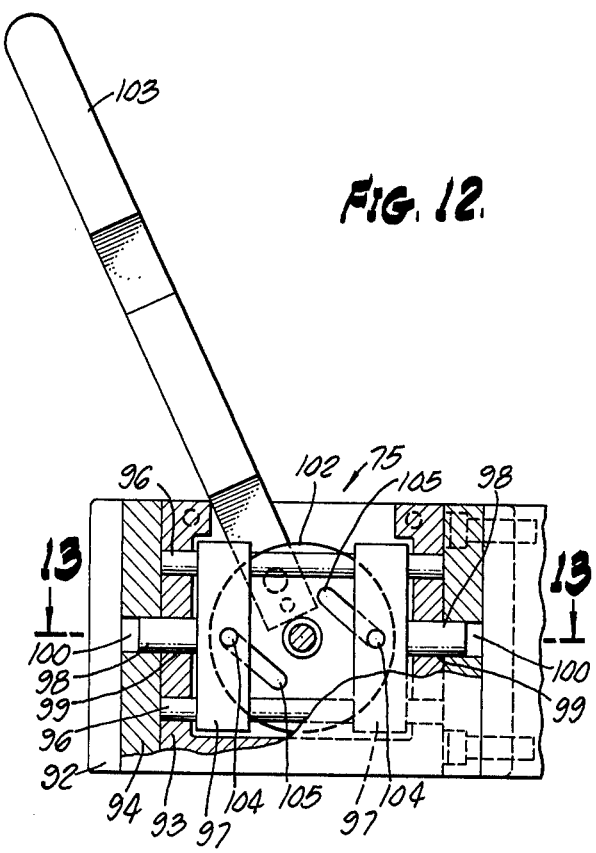
FIG. 12 is a front elevation partly in section, showing a release mechanism for disconnecting the body harness from the other parts of the device, showing the parts in locked position.
Figure 13:
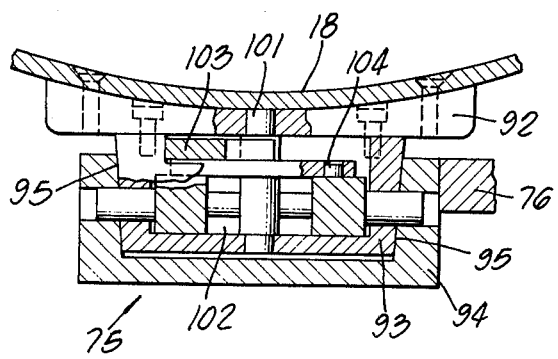
FIG. 13 is a sectional plan view taken substantially on the lines 13—13 as shown in FIG. 12.
Figure 14:
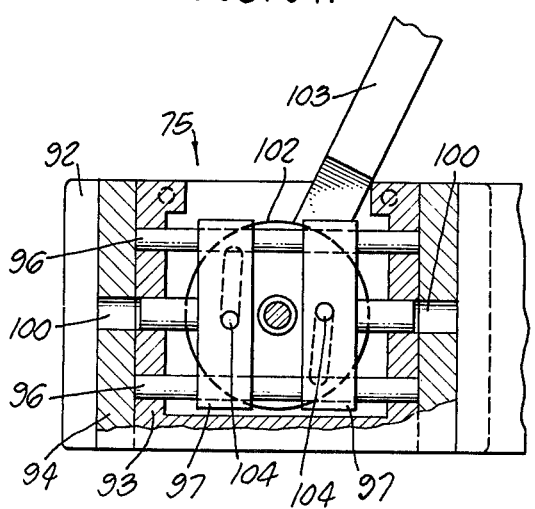
FIG. 14 is a view similar to FIG. 12 showing the parts in release position.

The releasable latch mechanism generally designated 75 is best shown in FIGS. 12-14. A mounting plate 92 is fixed at a central forward position on the belt 18, and a tapered metal block 93 is secured to this mounting plate 92. The tapered block 93 is received within a receptacle 94 having tapered walls 95. Parallel horizontal guide rods 96 are fixed within the tapered block 93, and two cross bars 97 are mounted to slide on these guide rods 96. Each cross bar 97 carries a locking pin 98 which passes through an opening 99 in the tapered block and is received within a locking recess 100 in the receptacle 94. The locking pins 98 are shown in locked position in FIGS. 12 and are shown in retracted or release position in FIG. 14.

Means are provided for actuating the locking pin 98, and, as shown in the drawings, a disk 102 is mounted to turn on a stationary shaft 101 fixed to the mounting plate 92 and to the tapered block 93. An actuating lever 103 is fixed to the disk 102 and projects upward in front of the body harness 17. Pins 104 fixed to the disk 102 are carried on the cross bars 97 and project into angular slots 105 formed in the disk 102. Accordingly, manual movement of the actuating lever 103 in a clockwise direction, as viewed in FIGS. 12-14, serves to retract the locking pins 98 from the locking recesses 100, thereby completely disconnecting the tapered block 93 from the receptacle 94. The curved member 76 which supports the entire camera support device is thus disengaged from the body harness 17. This is an important safety feature, since it enables the person carrying the entire assembly to disengage himself from it instantly, in the event of an emergency, such as, for example, falling into the water. Without this instant disconnect feature, the cameraman or camera operator might be dragged under the water by the weight of the entire assembly, and drowned.

The battery carrier 13 at the lower end of the part 23 of the camera support tube 12 has a section 13a which may be swung laterally about the vertical pivot pin 107. This section 13a comprises the battery which supplies power to operate the motion picture camera assembly 10. It may be swung laterally to an adjusted position in order to compensate for any tendency of the camera support tube member to tilt laterally to one side about the gimbal device 14.

If desired, a protective bellows device 108 may be provided to enclose the arm assemblies 15 and 16 as a safety measure, as well as to exclude dust and other foreign material.

A motor 110 may be located in the battery carrier 13, if desired, and connected by telescopic drive shafts 111 and 112 to drive the camera mechanism 113 through the belt drive 114. The weight of the camera motor 110 at the low position of the battery carrier 13 assists in stabilizing the motion picture camera assembly against unwanted rocking movement about the gimbal device 14. The drive shaft parts 111 and 112 are mounted concentrically within the parts 22 and 23 of the camera support tube member 22.

In operation, the body harness 17 is secured in place on the cameraman or camera operator who places his right hand on the grip collar 16 carried on the camera support tube member 12. The weight of the motion picture camera assembly 10, battery and battery carrier 13, and associated parts, is resiliently supported on the pneumatic piston-and-cylinder assemblies, and the entire weight is carried on the end portion 77 of the curved member 76. The view finder portion of the motion picture camera assembly 10 is positioned directly in front of the right eye of the person wearing the body harness. With his right hand he controls the direction of the camera, turning it freely in any direction. With the same hand he may move the tube member 12 and camera assembly 10 in any horizontal direction, including toward and away from the body harness, without changing the force of the springs in the articulated arms. His walking or running movements transmit very little unwanted movement to the camera assembly 10 which tends to "float" in space as he moves about. He may get down on his knees for a low angle shot, in which case the battery carrier 13 rests on the floor or ground, the lower part 23 telescoping up into the upper part 22 of the camera support tube member 12.

The angular adjustments afforded by the adjusting screw 79 and the adjusting screw 88, the vertical adjustment with respect to the upright rod 33, and the angular adjustment of the battery 13a permit the motion picture camera assembly 10 to be placed in just the right position, and to cause the camera support tube member 12 to remain in vertical position unless tilted by the right hand of the cameraman or camera operator. The height of the camera assembly 10 may be adjusted by changing the height of the gimbal ring clamp 26 with respect to the upper part 22 of the camera support tube member 12, as well as by changing the position of the bracket 34 with respect to the upright rod 33.

In addition to the standard view finder provided on the motion picture camera 10, a video screen device 118 may be mounted on the camera assembly 10 in a convenient location for viewing by the operator.

The operator does not attempt to change the focus or aperture while the motion picture camera is operating because this would introduce undesirable movements of the camera assembly 10. Instead, conventional remote control apparatus is provided so that another person may make such changes as are required. The person wearing the body harness 17 need only aim the camera in the direction desired and hold his right hand as steady as possible while moving about.

Where the terms "camera" or "motion picture camera" are used in this specification or claims, it is to be understood that the terms are to be given an interpretation sufficiently broad to cover a video camera of the type used for television.

Having fully described our invention, it is to be understood that we are not to be limited to the details herein set forth but that our invention is of the full scope of the appended claims.

We claim:

1. In a body-mounted support device of the type described, the combination of: a motion picture camera, an electric motor for driving the motion picture camera, a first vertical tube having an upper end supporting said camera, a sleeve rotatably mounted on said tube, a support element, horizontal pivot means connecting said sleeve to said support element, a body harness, means including a pair of serially connected articulated arm assemblies attached to said body harness and adapted to carry said support element, a second tube telescopically mounted on said first tube and extending downward therefrom, a carrier suspended on said second tube, means supporting said camera motor on said carrier, and means including a telescopic drive shaft positioned within said tubes whereby said motor may drive said camera.

2. In a body-mounted support device for a camera, the combination of: an upright support tube member comprising an upper tube and a lower tube, a gimbal device carrying said upper tube, means on said upper tube for supporting a camera, means on the lower tube for supporting a battery carrier, means connecting said tubes for telescopic movement, whereby the distance between the camera and the battery carrier may be changed, a body harness, a pair of articulated arm assemblies serially connected by pivot means having a substantially vertical axis, said arm assemblies being operatively interposed between said gimbal device and said body harness, and resilient means associated with each of said arm assemblies for supporting the weight of the parts carried by said gimbal device.

3. The combination set forth in claim 2 in which a block is attached to the articulated arm assembly nearest said body harness, movable locking pins carried by said block, walls forming a receptacle on said body harness for reception of said block, locking recesses in said walls, movable locking pins carried on said block, and a lever operatively connected to project said locking pins into said locking recesses and to retract them therefrom.

* * * * *

UNITED STATES PATENT AND TRADEMARK OFFICE
CERTIFICATE OF CORRECTION

PATENT NO. : 4,158,488
DATED : June 19, 1979
INVENTOR(S) : Robert E. Gottschalk et al It is certified that error appears in the above-identified patent and that said Letters Patent are hereby corrected as shown below:

Column 3, line 59, after "12" insert --and 13--.

*Signed and Sealed this*

*Twenty-fifth* Day of *September 1979*

[SEAL]

*Attest:*

LUTRELLE F. PARKER

*Attesting Officer    Acting Commissioner of Patents and Trademarks*